United States Patent
Sone et al.

(10) Patent No.: US 6,299,543 B1
(45) Date of Patent: *Oct. 9, 2001

(54) PLUNGING TYPE CONSTANT VELOCITY JOINT

(75) Inventors: Keisuke Sone, Hamamatsu; Kazuhiko Hozumi, Fukuroi; Yoshihisa Kaneko, Shizuoka-ken; Tatsuro Sugiyama, Iwata; Takeshi Ikeda, Iwata; Yutaka Tanigaki, Iwata, all of (JP)

(73) Assignee: NTN Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/000,491

(22) PCT Filed: Jun. 7, 1997

(86) PCT No.: PCT/JP97/01958

§ 371 Date: May 15, 1998

§ 102(e) Date: May 15, 1998

(87) PCT Pub. No.: WO98/00646

PCT Pub. Date: Jan. 8, 1998

(30) Foreign Application Priority Data

Jun. 28, 1996 (JP) .................................. 8-169972
Mar. 19, 1997 (JP) .................................. 9-66504

(51) Int. Cl.[7] .................................................. F16D 3/16
(52) U.S. Cl. .......................................... 464/146; 464/144
(58) Field of Search .................. 464/141, 142, 464/145, 146, 906

(56) References Cited

U.S. PATENT DOCUMENTS

| | | | | |
|---|---|---|---|---|
| 2,322,570 | * | 6/1943 | Dodge ................... | 464/906 X |
| 2,653,456 | * | 9/1953 | Heym .................... | 464/906 X |
| 3,464,232 | * | 9/1969 | Hutchinson ............. | 464/146 |
| 4,090,375 | * | 5/1978 | Takahashi et al. ....... | 464/146 |
| 4,549,873 | * | 10/1985 | Krude ................... | 464/141 |
| 5,106,343 | * | 4/1992 | Sakaguchi et al. ....... | 464/146 |
| 5,685,777 | * | 11/1997 | Schwarzler ............. | 464/906 |
| 6,120,382 | * | 9/2000 | Sone et al. ............ | 464/145 |

FOREIGN PATENT DOCUMENTS

| | | |
|---|---|---|
| 24 19 236 | 5/1975 | (DE) . |
| 2419236 | 5/1975 | (DE) . |
| 1 523 170 | 8/1978 | (GB) . |
| 2 004 028 | 3/1979 | (GB) . |
| 2104190 | 3/1983 | (GB) . |
| 58-30529 | 2/1983 | (JP) . |
| 1-250619 | 10/1989 | (JP) . |
| 4-8921 | 1/1992 | (JP) . |
| 4-42927 | 4/1992 | (JP) . |
| 4-307117 | 10/1992 | (JP) . |
| 8-128454 | 5/1996 | (JP) . |

* cited by examiner

Primary Examiner—Lynne H. Browne
Assistant Examiner—Greg Binda
(74) Attorney, Agent, or Firm—Arent Fox Kintner Fox & Kahn, PLLC

(57) ABSTRACT

The constant velocity joint comprises an outer joint member 1 in which eight linear guide grooves 1b are axially formed on an inner cylindrical surface 1a thereof, an inner joint member 2 in which eight linear guide grooves 2b are axially formed on an outer spherical surface 2a thereof and serrations 2c for connecting a shaft are formed on an inner surface thereof, eight torque transmitting balls 3 disposed in the ball tracks formed by cooperation of the guide grooves 1b of the outer joint member 1 and the guide grooves 2b of the inner joint member 2, and a cage 4 for retaining the torque transmitting balls 3. The spherical center B of the outer spherical surface 4b and the spherical center A of the inner spherical surface 4a of the cage 4 are respectively offset equidistantly to the opposite side in the axial direction with respect to the center 0 of the pocket 4c.

9 Claims, 9 Drawing Sheets

PLUNGING TYPE CONSTANT VELOCITY JOINT

BACKGROUND OF THE INVENTION

The present invention relates to a plunging type constant velocity joint equipped with eight torque transmitting balls, and especially preferably used for a power transmission mechanism for automobile.

There are two types in a constant velocity joint, one of which is a ball fixed type which is able to permit only angular displacement between two axes and the other of which is a plunging type which is able to permit both angular displacement and axial displacement between two axes. They are selectively used, depending on the use conditions, applications, etc. A Zepper type constant velocity joint is representative as the fixed type, and a double offset type constant velocity joint and a tripod type constant velocity joint are representative as the plunging type. As for the plunging type, the tripod type constant velocity joint uses rollers as torque transmitting members, and the others use balls as torque transmitting members.

For example, a double offset type constant velocity joint comprises an outer joint member in which six linear guide grooves are axially formed on an inner cylindrical surface thereof, an inner joint member in which six linear guide grooves are axially formed on an outer spherical surface thereof, six torque transmitting balls disposed in ball tracks formed by cooperation of the guide grooves of the outer joint member and the guide grooves of the inner joint member, and a cage for retaining the torque transmitting balls. Since the spherical center of the outer spherical surface of the cage and the spherical center of the inner spherical surface thereof are offset to the opposite side in the axial direction from the center of pockets, they are called "double offset type". When this kind of joint transmits a torque while taking an operating angle, the cage rotates to the position of the torque transmitting balls moving in the ball tracks in response to the inclination of the inner joint member to retains the torque transmitting balls on the bisector plane bisecting the operating angle. Furthermore, as the outer joint member and the inner joint member relatively displace in the axial direction, a slipping occurs between the outer spherical surface of the cage and the inner cylindrical surface of the outer joint member to ensure a smooth axial displacement (plunging).

SUMMARY OF THE INVENTION

It is therefore an object of the invention, in a plunging type constant velocity joint described above, to make further compact in size and to secure a strength, load capacity and durability equivalent to or exceeding those of a comparative article (a plunging type constant velocity joint having six torque transmitting balls as described above), thereby to provide a plunging type constant velocity joint especially preferably used for a power transmission mechanism in automobile.

In order to achieve the above mentioned object, the invention provides a plunging type constant velocity joint equipped with an outer joint member having a plurality of linear guide grooves axially formed on an inner cylindrical surface thereof, an inner joint member having a plurality of linear guide grooves axially formed on an outer spherical surface thereof, torque transmitting balls disposed in ball tracks formed by cooperation of the guide grooves of the outer joint member and those of the inner joint member, a cage having pockets for retaining torque transmitting balls. An outer spherical surface of the cage brought into contact with the inner cylindrical surface of the outer joint member to be guided by the same, and an inner spherical surface of the cage brought into contact with the outer spherical surface of the inner joint member to guided by the same. The spherical center of the outer spherical surface and the spherical center of the inner spherical surface of the cage are axially offset to the opposite side with respect to the center of the pockets. The number of the ball tracks and that of the torque transmitting balls are respectively eight.

The ratio r1 ($=PCD_{BALL}/D_{BALL}$) of the pitch circle diameter ($PCD_{BALL}$) to the diameter ($D_{BALL}$) of the torque transmitting balls can be in the range of $2.9 \leq r1 \leq 4.5$, wherein the pitch circle diameter ($PCD_{BALL}$) of the torque transmitting balls is equal to the distance between the centers of two torque transmitting balls positioned in ball tracks 180° opposed to each other at operating angle 0 deg.

The reason why the range of $2.9 \leq r1 \leq 4.5$ is employed resides in that the strength of the outer joint members, etc., load capacity and durability of the joints are made equivalent to or exceed those of the comparative article (a plunging type constant velocity joint having six balls). That is, since it is difficult to greatly change the pitch circle diameter ($PCD_{BALL}$) of the torque transmitting balls in a limited space in a constant velocity joint, the figure of r1 mainly depends on the diameter ($D_{BALL}$) of the torque transmitting balls. If $r1 < 2.9$ (mainly in a case where the diameter $D_{BALL}$ is greater), the thickness of other components (outer joint member, inner joint member, etc.) is made too thin, there arises a worry in view of the strength. Contrarily, if $r1 > 4.5$ (mainly in a case where the diameter $D_{BALL}$ is smaller), the load capacity is decreased and there arises a worry in view of the durability. Furthermore, if the constant pressure at the contacting area between the torque transmitting balls and the guide grooves is increased (since the contacting ellipse at the contacting are is decreased if the diameter $D_{BALL}$ is decreased), there is a possibility that this results in a damage of the groove shoulder edge portion of the guide groove.

By establishing $2.9 \leq r1 \leq 4.5$, it is possible to secure the strength of the outer joint member, etc., load capacity and durability of the joint equivalent to or exceeding those of the comparative article (a plunging type constant velocity joint having six balls). This has been proven to some degree by tests.

As shown in Table 1 (which shows the evaluation on the basis of comparison tests), when r1 is established to be 2.8, a sufficient strength of the outer joint member, the inner joint member and a cage can not be secured, and unfavorable results are produced. When r1 is established to 2.9 or 3.0, a roughly satisfactory result could be obtained in view of the strength thereof. Especially, in a case where $r1 \geq 3.1$ is established, the strength of the outer joint member, the inner joint member and the cage, and the durability of the joint can be sufficiently secured, and a favorable result can be obtained. Furthermore, in a case where $r1 > 3.7$, the test has not been carried out yet. But it can be presumed that a favorable result can be obtained as in the above. However, if $r1 > 4.5$, it is considered that a problem arises in view of the durability and strength of the outer joint member and the inner joint member. It is better that $r1 \leq 4.5$ is established.

Based on the above description, it is better that r1 is established to be $2.9 \leq r1 \leq 4.5$, more favorably $3.1 \leq r1 \leq 4.5$.

Furthermore, in addition to the above construction, it is better that the ratio r2 ($=D_{OUTER}/PCD_{SERR}$) of the outer diameter ($D_{OUTER}$) of the outer joint member to the pitch circle diameter ($PCD_{SERR}$) of serrations formed on an inner surface of the inner joint member is established to be $2.5 \leq r2 \leq 3.5$.

The reason why 2.5≦r2≦3.5 is established resides in that the pitch circle diameter ($PCD_{SERR}$) of the serrations of the inner joint member can not be greatly changed in view of the strength of a shaft connecting thereto. Therefore, the figure of r2 depends mainly on the outer diameter ($D_{OUTER}$) of the outer joint member. If r2<2.5 is established (mainly in a case where the outer diameter $D_{OUTER}$ is smaller), the thickness of the respective components (outer joint member, inner joint member, etc.) is made too thin, a worry arises in view of the strength. On the other hand, r2>3.5 is established (mainly in a case where the outer diameter $D_{OUTER}$ is larger), a problem arises in use in view of the dimensional aspect, and the object of making compact can not be achieved. By establishing 2.5≦r2≦3.5, the strength of the outer joint member, etc., and durability of the joints equivalent to or exceeding those of the comparative article (a plunging type constant velocity joint having six balls) can be obtained, and various requirements in use can be satisfied. Especially, by establishing 2.5≦r2<3.1, there is an advantage with which the outer diameter thereof can be made compact with respect to the comparative article (a plunging type constant velocity joint having six balls) having the same nominal type.

Based on the above description, it is better that r2 is set to be 2.5≦r2≦3.5, preferably 2.5≦r2<3.1.

Furthermore, it is better that the spherical center of the outer spherical surface and the spherical center of the inner spherical surface of the cage are equidistantly (dimension f) offset to the opposite side in the axial direction with respect to the center of the pockets, and the ratio r3(=f/$PCD_{BALL}$) of the offset amount (f) to the pitch circle diameter ($PCD_{BALL}$) of the torque transmitting balls is established to be 0.05≦r3≦0.15.

The reason why 0.05≦r3≦0.15 is established resides in that if r3≦0.05, the guiding force of the cage which guides the torque transmitting balls on bisector the plane bisecting an operating angle is decreased when the operating angle is given to thereby cause the operatability and constant velocity of the joint to be made unstable, and on the other hand if r3>0.15 is established, the thickness of the cage at one side portion in the axial direction thereof is made too thin and the strength thereof is decreased, and there causes a possibility for the torque transmitting balls to slip off from the respective pockets. By establishing 0.05≦r3≦0.15, a stabilized operatability and constant velocity of the joint can be secured, and simultaneously it is possible to prevent the strength of the cage from being decreased and to prevent the torque transmitting balls from slipping off from the pockets.

DESCRIPTION OF PREFERRED EMBODIMENT

Hereinafter, preferred embodiments of the invention are described with reference to the accompanying drawings.

Figure 1A:
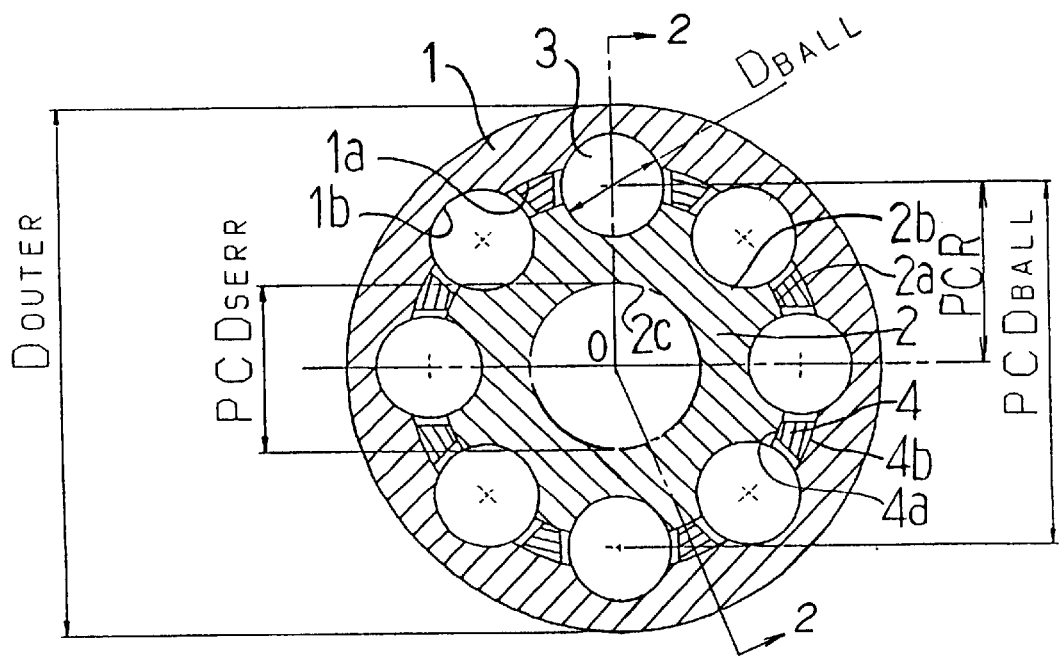
FIG. 1A is a cross-sectional view (a section taken along the line 1—1 in FIG. 1B) showing a constant velocity joint according to a embodiment of the invention.
Figure 1B:
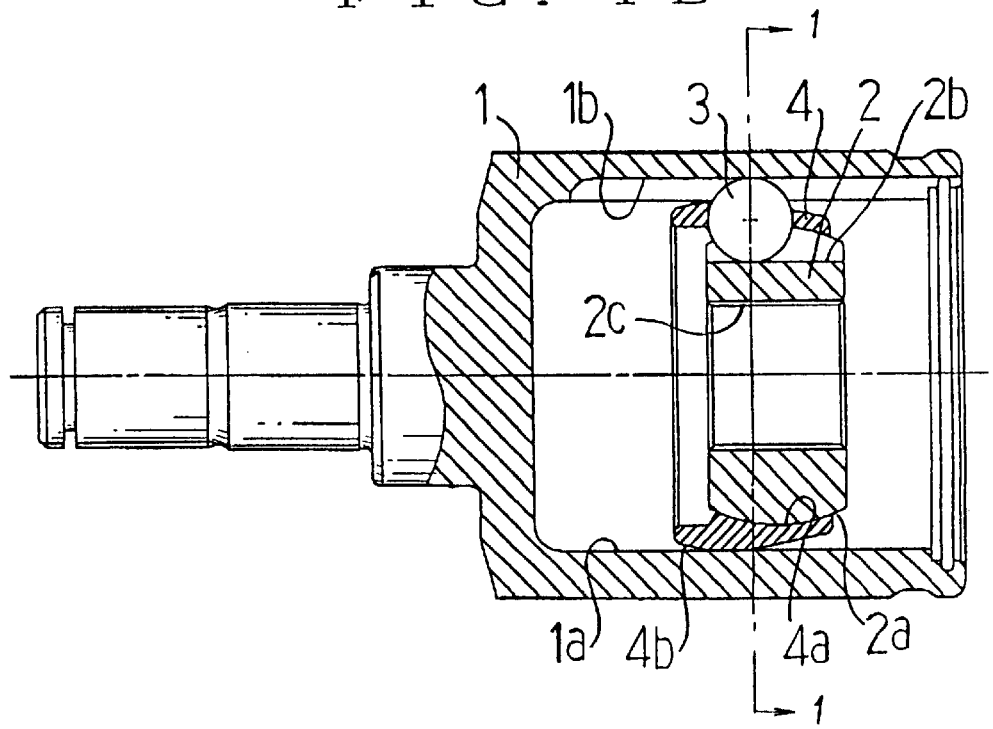
FIG. 1B is a longitudinal sectional view thereof (a section taken along the line 2—2 in FIG. 1A).

FIG. 1 shows a double offset type constant velocity joint as a plunging type constant velocity joint according to the preferred embodiment. The constant velocity joint comprises an outer joint member 1 in which eight linear guide grooves 1b are axially formed on an inner cylindrical surface 1a thereof, an inner joint member 2 in which eight linear guide grooves 2b are axially formed on an outer spherical surface 2a thereof and serrations 2c (or splines) for connecting a shaft are formed on an inner surface thereof, eight torque transmitting balls 3 disposed in the ball tracks formed by cooperation of the guide grooves 1b of the outer joint member 1 and the guide grooves 2b of the inner joint member 2, and a cage 4 for retaining the torque transmitting balls 3.

Figure 2:
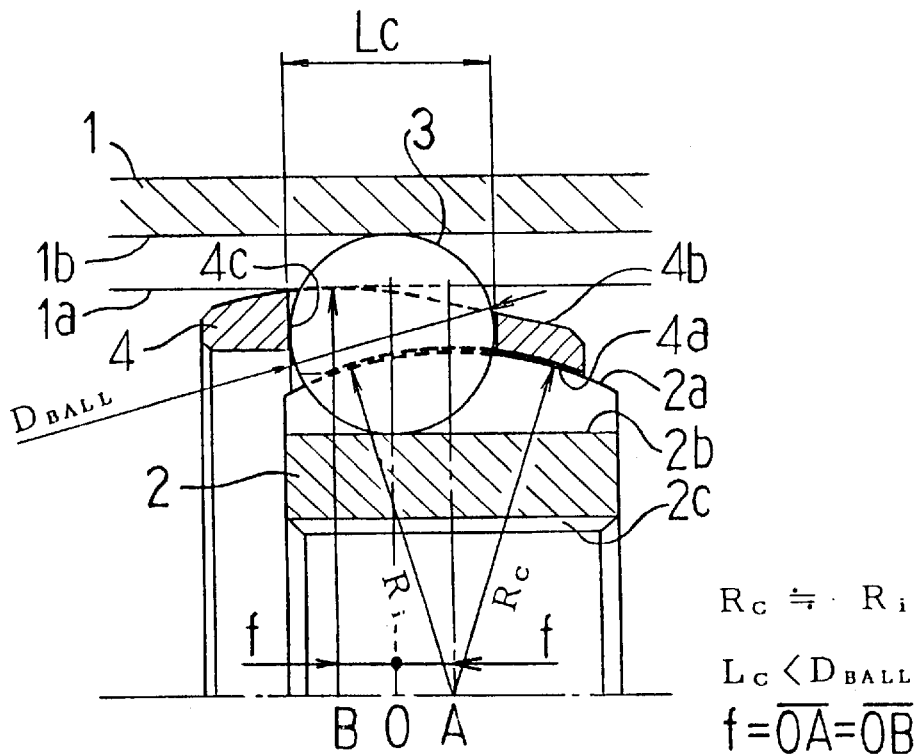
FIG. 2 through FIG. 4 are a partially enlarged view of a constant velocity joint according to embodiments.

As shown in enlargement in FIG. 2, the cage 4 is of an annular member having an outer spherical surface 4b which is brought into contact with the inner cylindrical surface 1a of the outer joint member 1 to be guided by the same, an inner spherical surface 4a which is brought into contact with the outer spherical surface 2a of the inner joint member 2 to be guided by the same, and eight pockets 4c in which the torque transmitting balls 3 are retained. The spherical center B of the outer spherical surface 4b and the spherical center A of the inner spherical surface 4a are respectively offset equidistantly to the opposite side in the axial direction with respect to the center 0 of the pocket 4c (The offset amount f=linear segment 0A=linear segment 0B). The curvature radius Rc of the inner spherical surface 4a of the cage 4 is roughly equivalent to the radius curvature Ri of the outer spherical surface 2a of the inner joint member (that is, they are equal to each other in appearance), and the axial dimension Lc of the pocket 4c of the cage 4 is slightly smaller than the diameter $D_{BALL}$ of the torque transmitting ball 3.

When the outer joint member 1 and the inner joint member 2 are displaced relative to each other by an angle θ, the torque transmitting balls 3 guided by the cage 4 is always maintained on the bisector plane (θ/2) of the angle θ at every operating angle θ, whereby the constant velocity of the joint can be maintained.

In this embodiment, the main dimensions of the joint are set as follows: As described above, (1) In view of securing the strength of the outer joint members, etc., load capacity and durability of the joint, it is favorable that the ratio r1 (=$PCD_{BALL}/D_{BALL}$) of the pitch circle diameter $PCD_{BALL}$ ($PCD_{BALL}$=2×PCR) to the diameter $D_{BALL}$ of the torque transmitting balls is established to be 2.9≦r1≦4.5, preferably 3.1≦r1≦4.5. In this embodiment, r1 is set to 3.6.

(2) The ratio r2 (=$D_{OUTER}/PCD_{SERR}$) of the outer diameter $D_{OUTER}$ of the outer joint member 1 to the pitch circle diameter $PCD_{SERR}$ of the serrations (or splines) 26 of the inner joint member 2 is established to be 2.5≦r2≦3.5, preferably 2.5≦r2<3.1. The above construction (1) may be independently employed. Furthermore, PCR in FIG. 1 is the dimension which is equal to one half of the pitch circle diameter $PCD_{BALL}$ (That is, $PCD_{BALL}=2\times PCR$).

The above constructions (1) and (2) were compared with the comparative article (a double offset type constant velocity joint having six balls). The result is as shown in Table 2.

Furthermore, in this embodiment, (3) The ratio r3 ($=f/PCD_{BALL}$) of the offset amount (f) of the cage 4 to the pitch circle diameter ($PCD_{BALL}$) of the torque transmitting balls 3 is established to be $0.05 \leq r3 \leq 0.15$ (in this embodiment, r3 is set to 0.08. In conventional joints, r3 is set to 1.0 or the like).

Since the constant velocity joint of the embodiment has eight torque transmitting balls 3, so that the load ratio per torque transmitting ball with respect to the total load capacity of the joint is decreased in comparison with the comparative article (a constant velocity joint having six balls), the diameter $D_{BALL}$ of the torque transmitting balls 3 can be decreased in comparison with the comparative article of the same nominal type (a constant velocity joint having six balls), and at the same time the thickness of the outer joint member 1 and that of the inner joint member 2 can be secured to the same degree as that of the comparative article (a constant velocity joint having six balls).

Still furthermore, it is possible to decrease the ratio r2 ($=D_{OUTER}/PCD_{SERR}$) ($2.5 \leq r2 < 3.1$) in comparison with the comparative article of the same nominal type (a constant velocity joint having six balls), thereby it is possible to make further compact in size while securing the strength, load capacity and durability equivalent to or exceeding those of the comparative article.

Furthermore, since the ratio r3 is established to be $0.05 \leq r3 \leq 0.15$, it is possible to prevent the cage 4 from being decreased in strength and to prevent the torque transmitting balls 3 from slipping off from the pockets 4c while securing operatability and constant velocity of the joint.

Figure 5:
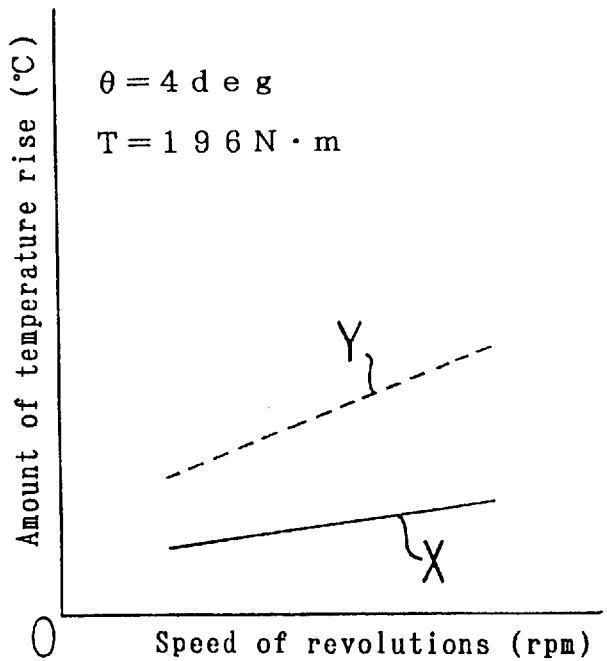
FIG. 5 is a view showing the relationship between the number of revolutions and temperature rise.
Figure 6:
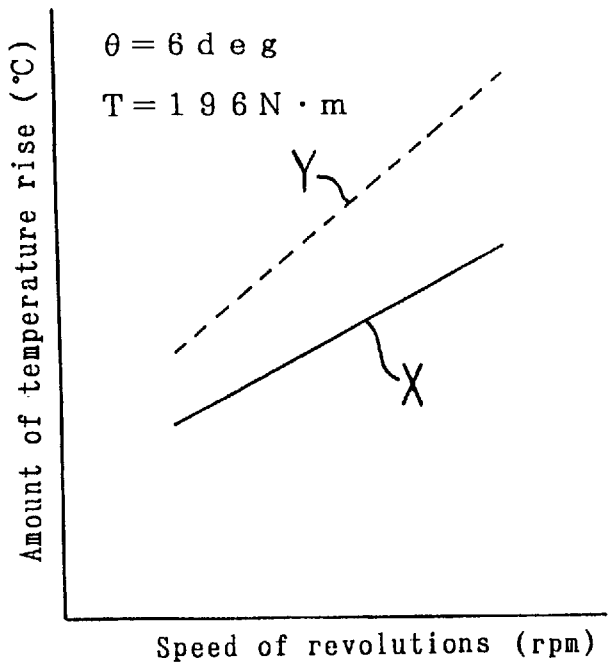
FIG. 6 is a view showing the relationship between the number of revolutions and temperature rise.

FIG. 5 and FIG. 6 show the results of comparison tests of the relationships between the number of revolutions (rpm) and temperature rise (° C.) with respect to the joint according of the embodiment and the comparative article (a double offset type constant velocity joint having six balls) (either of them has the same nominal size). In these drawings, X shows a joint according to the embodiment, and Y shows the comparative article. The temperature rise (° C.) is the data measured in 30 minutes after the commencement of operation. θ is an operating angle of the joint, and T is an input torque.

As been made clear from the test results shown in these drawings, the temperature rise of the joint (X) according to the embodiment is lower than that of the comparative article (Y), and the difference therebetween is made greater as the number of revolutions is increased. A decrease of the temperature rise results in an increase of the temperature rise can be obtained regardless of the magnitude of operating angle (θ) and input torque (T).

As described above, according to the constant velocity joint of the embodiment, the load capacity and durability equivalent to or exceeding those of the comparative article can be obtained while the size thereof is compact.

In a case where this kind of constant velocity joint is used in such conditions where an angular displacement and/or axial displacement are produced while transmitting a torque of a drive shaft such as during running of automobile or idling while an automatic transmission vehicle stops, there is such a problem that vibrations coming from the engine side are transmitted to the vehicle body side to cause passengers to feel uncomfortable if the induced axial load and plunging resistance in the joint are great. The construction shown in FIG. 3 and FIG. 4 attempts to decrease such induced axial load and plunging resistance.

Figure 3:
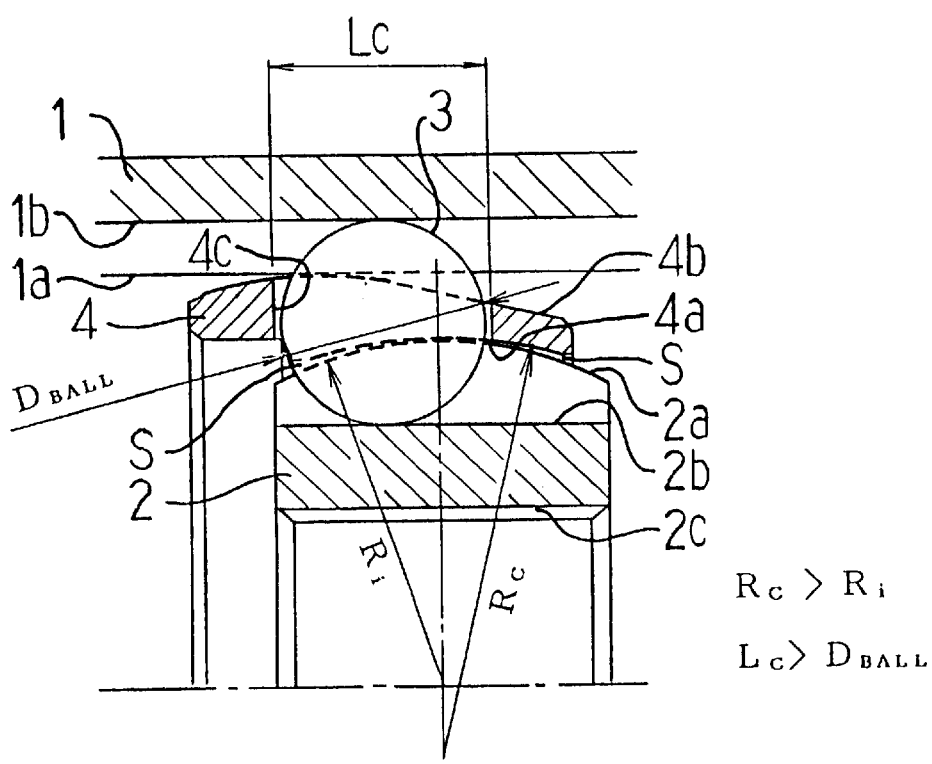

The constructions shown in FIG. 3 are such that a pocket clearance ($=LC-D_{BALL}$) is defined between the pocket 4c of the cage 4 and the torque transmitting ball 3, the curvature radius RC of the inner spherical surface 4a of the cage 4 is made greater than the Ri of the outer spherical surface 2a of the inner joint member 2 (the curvature center of the radius Rc is offset inwardly in the radial direction from the curvature center of the radius Ri), and an axial clearance S is defined therebetween. Since the axial clearance S is provided, the relative axial displacement is permitted between the cage 4 and the inner joint member 2, and since the pocket clearance ($=Lc-D_{BALL}$) is provided, smooth rolling of the torque transmitting balls 3 can be secured, whereby the induced axial load and plunging resistance are decreased. Simultaneously, since the vibrations coming from the drive side can be absorbed by the axial clearance and pocket clearance, the transmission of the vibrations to the vehicle body side can be suppressed.

Figure 4:
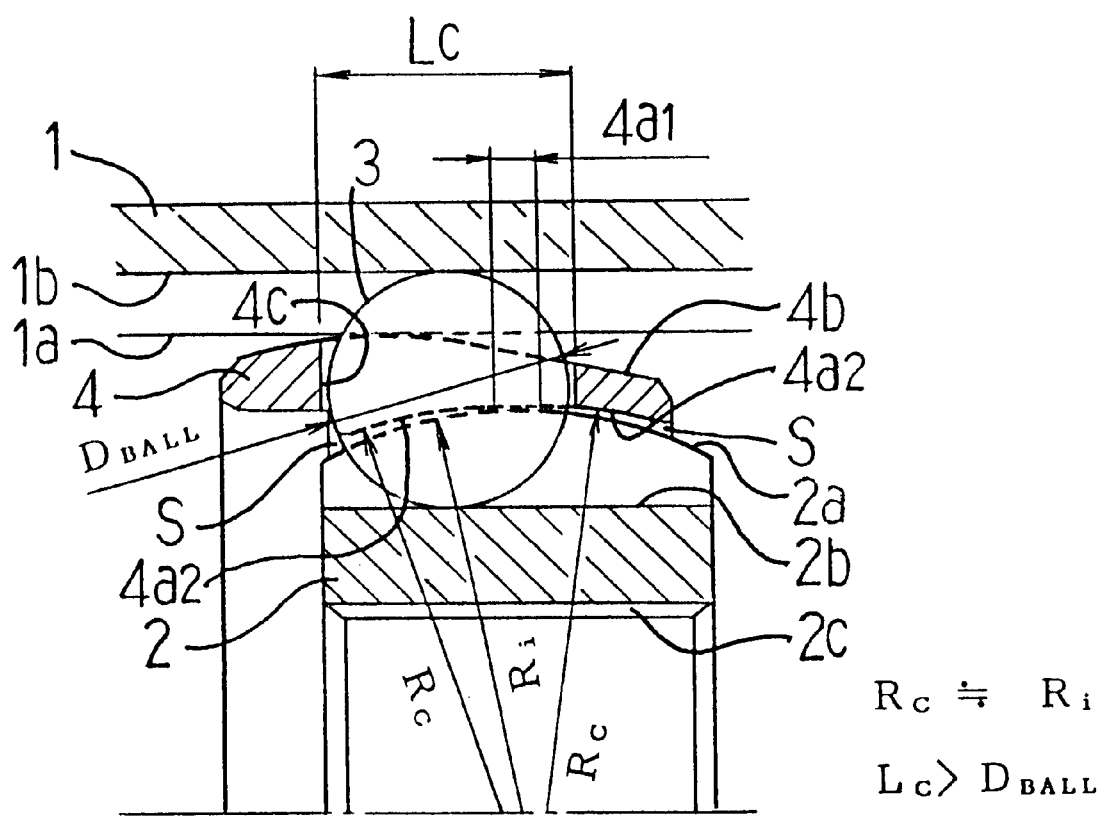

The construction shown in FIG. 4 is such that a cylindrical surface 4a1 of a suitable length is provided at the middle part of the inner spherical surface 4a of the cage 4, and partially spherical surfaces 4a2 having the curvature radium Rc which are roughly equivalent to (in appearance the same) as the curvature radius Ri of the outer spherical surface 2a of the inner joint member 2 are made consecutive at both sides of the cylindrical surface 4a1. When the cage 4 and inner joint member 2 are axially displaced relative to each other, the outer spherical surface 2a of the inner joint member 2 is guided by the cylindrical surface 4a1 of the cage 4, and moreover the outer spherical surface 2a is brought into spherical contact with the partially spherical surface 4a2, whereby the induced load and plunging resistance can be further decreased.

Figure 13:
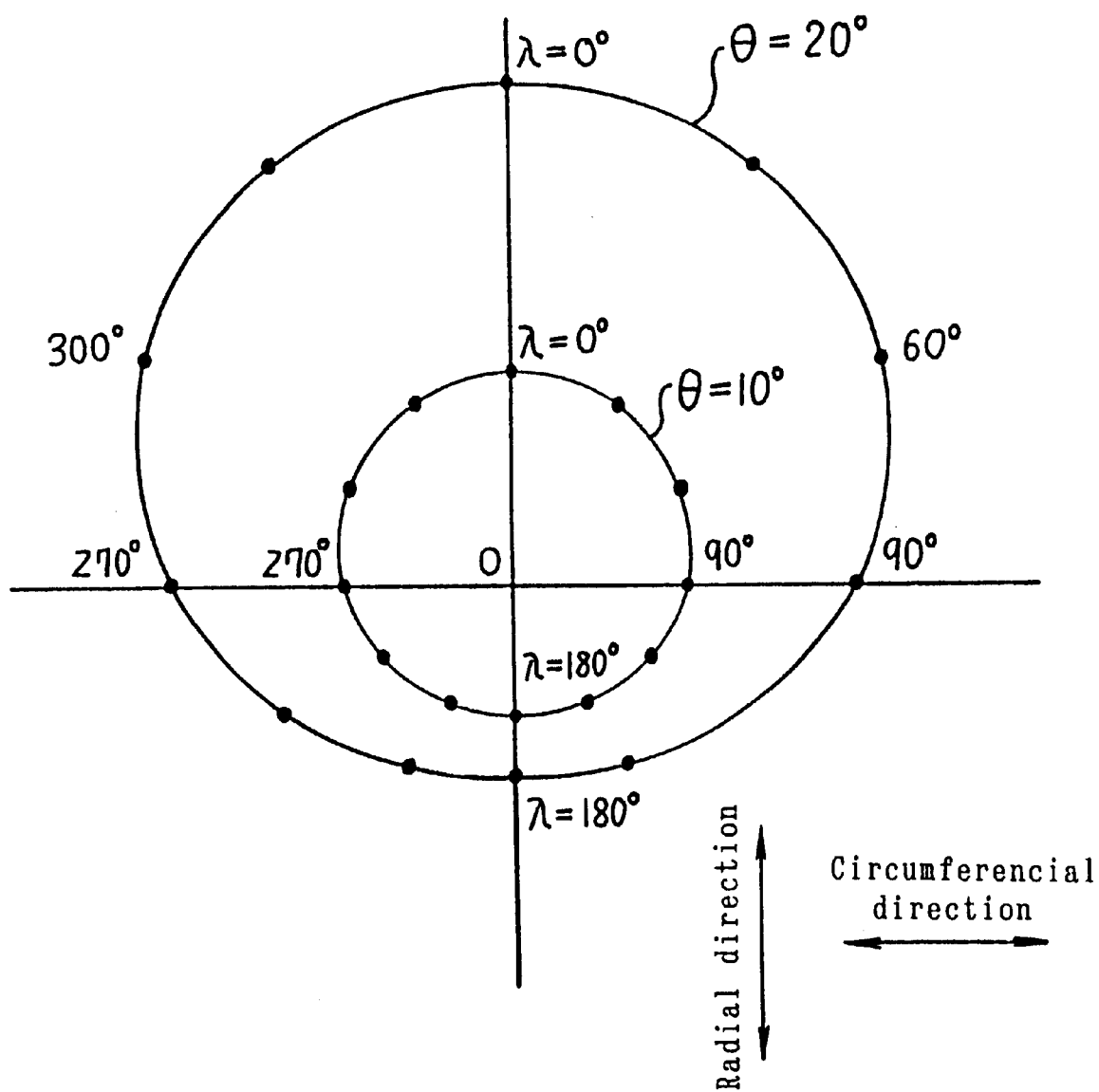
FIG. 13 is a view showing the locus of the contacting point between the torque transmitting ball and the pocket of the cage.

As described above, since the constant velocity joint according to the embodiment is provided with eight torque transmitting balls 3, the outer diameter thereof can be made further compact in comparison with the comparative article (a constant velocity joint having six balls). In this case, by mainly the diameter ($D_{BALL}$) of the torque transmitting ball 3 being made smaller, the depth of the guide groove 1b of the outer joint member 1 and the guide groove 2b of the inner joint member 2 and the thickness of the cage 4 are also made small in proportion to the reduction ratio of the diameter ($D_{BALL}$). However, the pitch circle diameter ($PCD_{BALL}$) of the torque transmitting balls 3 is not made small in proportion to the reduction ratio of the diameter ($D_{BALL}$). On the other hand, as shown in FIG. 13, when this kind of constant velocity joint transmits a torque while taking an operating angle θ, the torque transmitting balls 3 move in the circumferential direction and the radial direction in the pockets 4c of the cage 4 in line with the phase change in the rotating direction (FIG. 13 shows a locus of the contacting point between the torque transmitting ball 3 and pocket 4c). The amount of movement of the torque transmitting ball 3 is proportionate to the pitch circle diameter ($PCD_{BALL}$), operating angle θ, offset amount (f). Therefore, when the operating angle θ and offset amount (f) are constant, the amount of movement of the torque transmitting ball 3 is determined by the pitch circle diameter ($PCD_{BALL}$).

Figure 8:
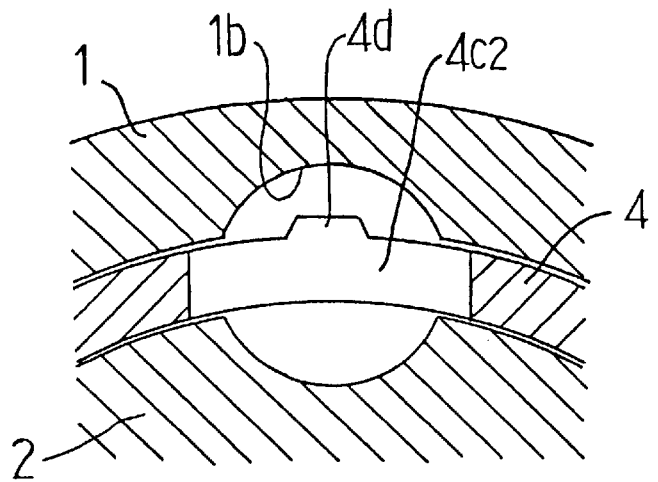
FIG. 8 is a sectional view showing a state where the cage shown in FIG. 7 is incorporated.
Figure 9:
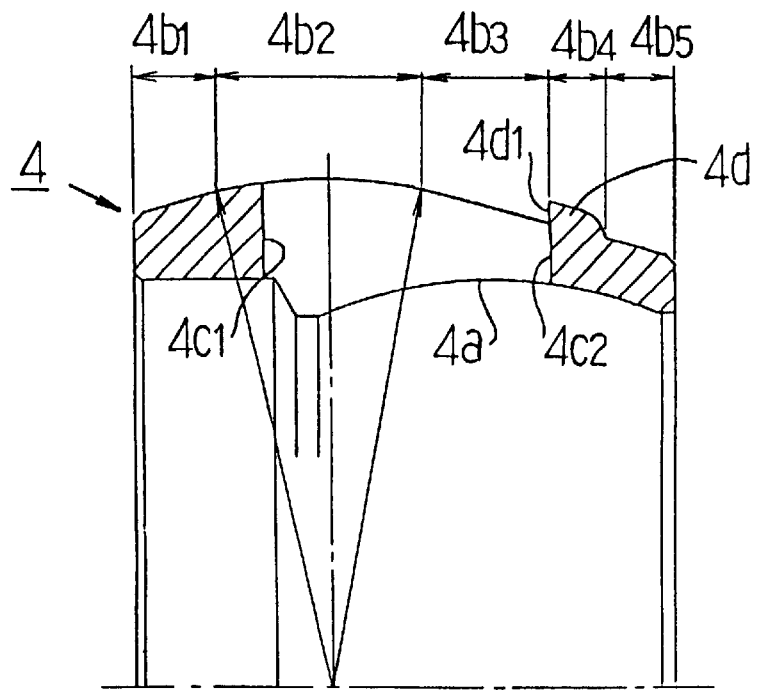
FIG. 9 is a view for explaining an example of machining the outer spherical surface of the cage shown in FIG. 7.

From the description, since in the constant velocity joint according to the embodiment, the thickness of cage 4 becomes relatively thin with respect to the amount of movement of the torque transmitting ball 3, especially the amount of radial movement, it can be predicted that the contacting point with the torque transmitting balls 3 may slip off from the pocket 4c in some use conditions by the movement of the torque transmitting ball 3 in the outer radial direction when an operating angle is given. The construction shown in FIG. 7 through FIG. 9 is for preventing such a disadvantage.

Figure 7A:
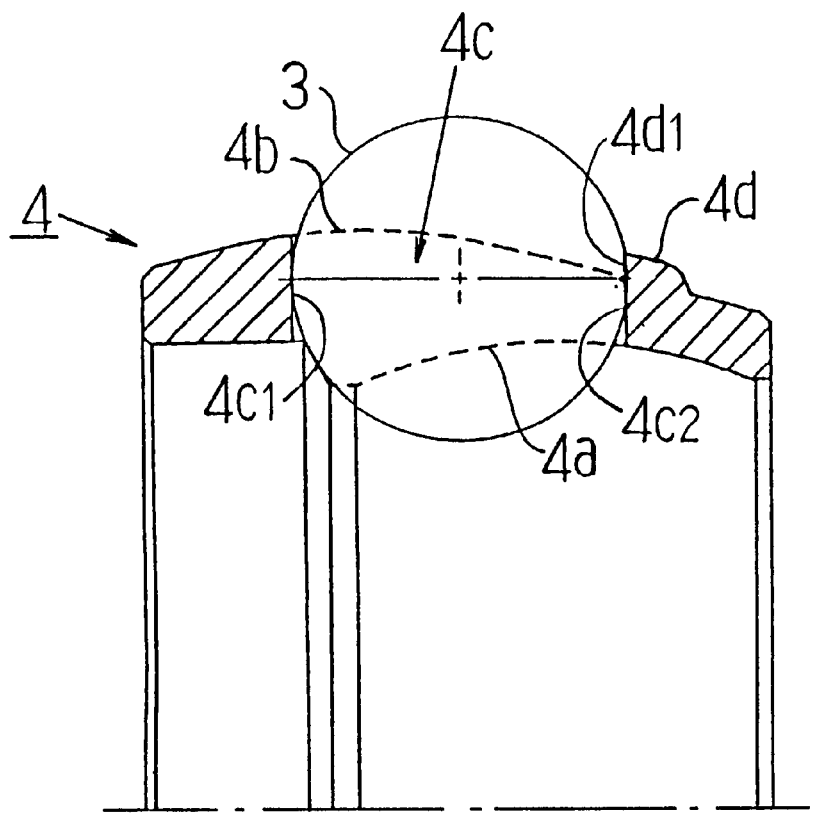
FIG. 7A is a sectional view showing another embodiment of the cage and FIG. 7B is a perspective view thereof.
Figure 7B:
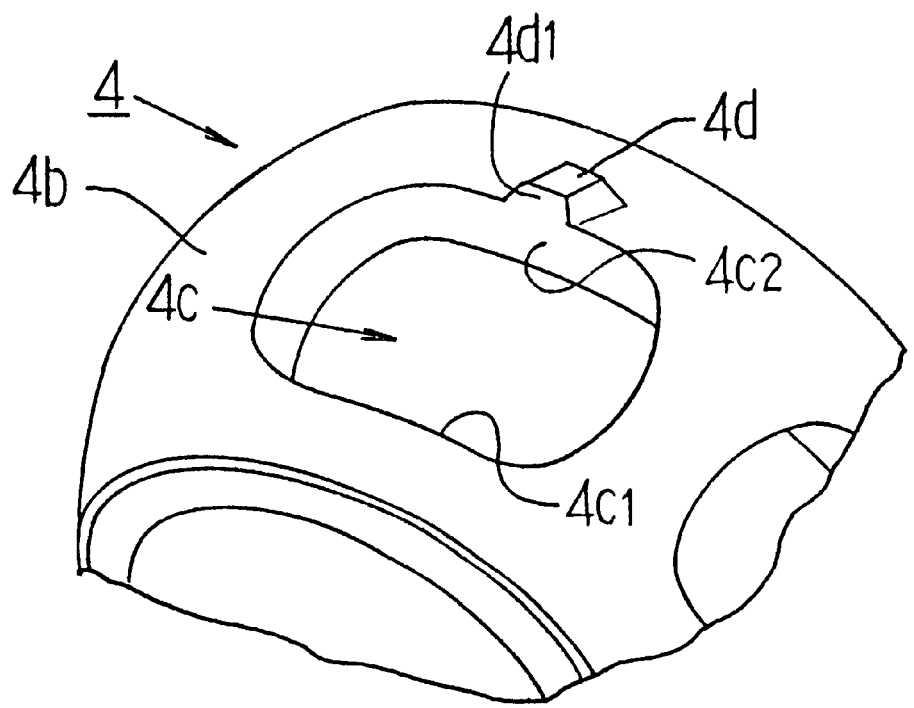

As shown in FIG. 7, each of the pockets 4c of the cage is window-like and is able to guide the torque transmitting ball 3 by a pair of pocket surfaces 4c1,4c2 opposed to each other in the axial direction thereof. When an operating angle is given, the problem of the contacting point with the torque transmitting ball 3 slipping off may occure at the small-diametered side pocket surface 4c2. Therefore, a projection 4d projecting from the outer spherical surface 4b of the cage 4 is provided in the vicinity of the small-diametered side pocket surface 4c2, thereby increasing the dimension in the radial direction of the pocket surface 4c2. Furthermore, the projection 4d is provided in the vicinity of each of the small-diametered side pockets 4c2.

The pocket side surface 4d1 of the projection 4d is formed to be flush with the pocket surface 4c2. The dimension projecting from the outer spherical surface 4b of the projection 4d is to be established so that the contacting point with the torque transmitting ball 3 do not slip off toward the outer diameter side even when the joint takes the maximum operating angle. In details, the dimension is set to an optimum figure on the basis of the amount of radial movement of torque transmitting ball 3 corresponding to operating angle θ, pitch circle diameter ($PCD_{BALL}$) and offset amount (f), the thickness of the cage 4, the use conditions, etc. In a case where the amount of radial movement of the torque transmitting balls is equivalent to that of the comparative article (a constant velocity joint having six balls), the projecting dimension of the projection 4d may be comparatively small.

The circumferential dimension of the projection 4d is set to an optimum figure, taking into consideration the amount of circumferential movement of the torque transmitting ball 3. It is preferable that the circumferential position of the projection 4d is the central of the pocket 4c. Furthermore, the axial dimension of the projection 4d is to be set to an optimum dimension capable of securing necessary durability, taking into consideration the contacting stress which the pocket side surface 4d1 receives from the torque transmitting ball 3.

As shown in FIG. 8, when the cage 4 of the above embodiment is incorporated between the outer joint member 1 and the inner joint member 2, the projection 4d comes to the position opposite to the guide groove 1b of the outer joint member 1. Therefore, even in a case where the joint takes the maximum operating angle, the projection 4d is not brought into contact with the outer joint member 1.

In order to decrease the production cost thereof, the outer spherical surface 4b of the cage 4 may be produced as described below (see FIG. 9). Firstly, the projection 4d is formed (formed by forging of the like) simultaneously with the basic shape of the cage 4. The grinding of the outer spherical surface 4b is performed for only the area (spherical surface 4b2) which is brought into contact with the inner cylindrical surface 1a of the outer joint member 1 when the joint operates. The circumferential surface 4b4 including the projection 4d remains as it is formed, and no other post-machining is given thereto. However, machining may be given to the outer spherical part of the projection 4d as necessary. The straight surfaces 4b1, 4b3, 4b5 may remain as they are formed or may be additionally machined necessary. Furthermore, the pocket side surface 4d1 of the projection 4d is machined as for that of the pocket surface 4c2.

Still furthermore, since the constant velocity joint according to the embodiment has a structural feature that the number of torque transmitting balls 3 is increased while the pitch circle diameter ($PCD_{BALL}$) is made small in comparison with the comparative article (a constant velocity joint having six balls), the circumferential dimension of post (the interval part between the pockets 4c) of the cage 4 tends to be small. The circumferential dimension of the post relates to the strength and durability of the cage 4, especially the circumferential dimension at the inner side thereof is important (because the circumferential dimension at the inner side is smaller than that at the outer side). The constructions shown in FIG. 10 and FIG. 11 are for compensating a decrease of the circumferential dimension of the post.

Figure 10:
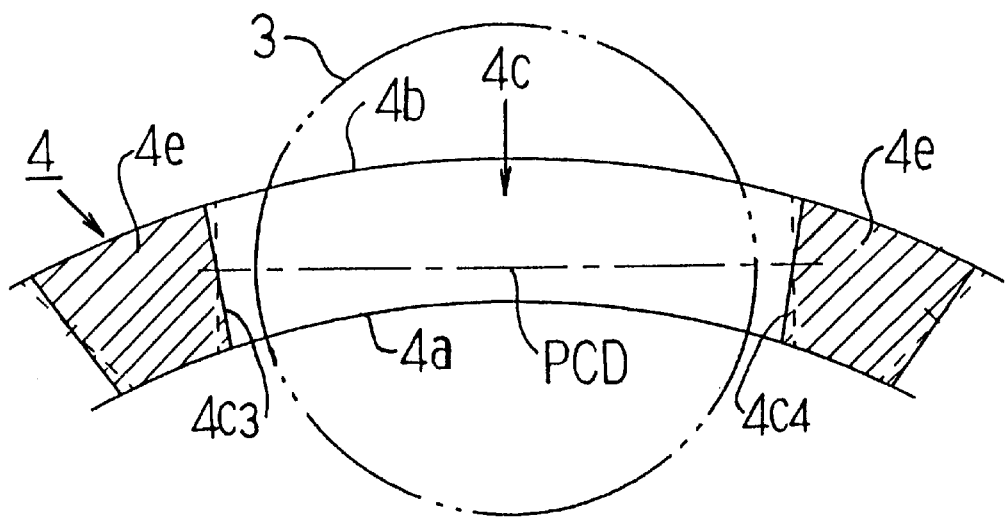
FIG. 10 and FIG. 11 are still another embodiment of cage.

With the construction shown in FIG. 10, a pair of pocket surfaces opposed to each other in the circumferential direction are respectively made tapered surfaces 4c3, 4c4 spread toward the outer diameter side. In comparison with a case where the pocket surfaces are made a straight plane as shown with a broken line in the same drawing, it is possible to make greater the circumferential dimension at the inner side of the post 4e, it is advantageous in view of securing the strength and durability of the cage 4.

Figure 11:
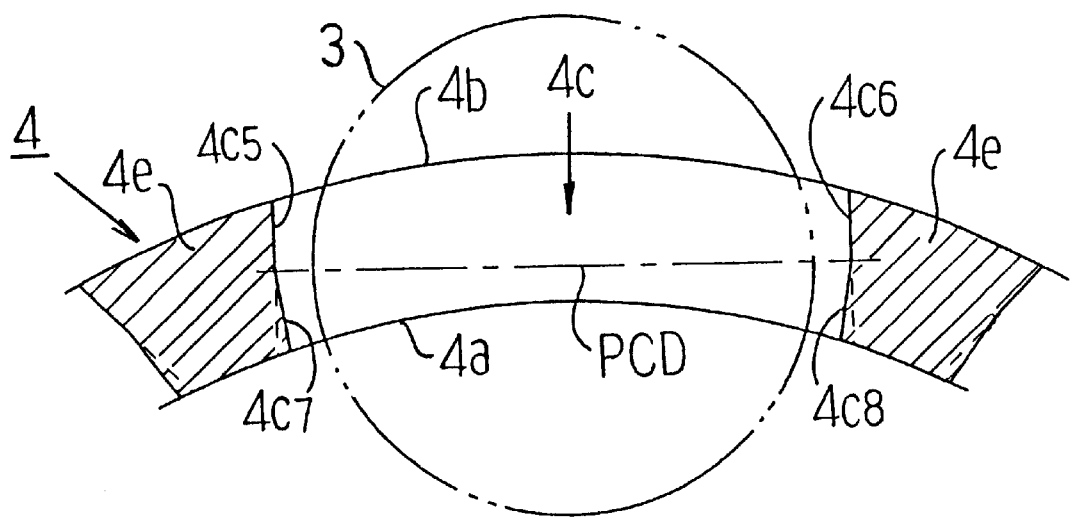

With the construction shown in FIG. 11, a pair of pocket surfaces opposed to each other in the circumferential direction are respectively made tapered surfaces 4c3, 4c4 spread toward the outer diameter side. In comparison with a case where the pocket surfaces are made a straight plane as shown with a broken line in the same drawing, it is possible to make greater the circumferential dimension at the inner side of the post 4e, it is advantageous in view of securing the strength and durability of the cage 4.

With the construction shown in FIG. 11, a pair of pocket surfaces opposed to each other in the circumferential direction are respectively made a composite plane consisting of straight planes 4c5, 4c6 and tapered surfaces 4c7,4c8 spread toward the outer diameter side. The straight planes 4c5,4c6 are positioned at the outer diameter side, and the tapered surfaces 4c7,4c8 are positioned at the inner diameter side. The boundary between the straight planes 4c5,4c6 and the tapered surfaces 4c7,4c8 is located at the inner diameter side beyond the pitch circle PCD of the torque transmitting balls 3. In comparison with a case where the pocket surfaces are made only a straight plane as shown with a broken line in the same drawing, since it is possible to take a greater circumferential dimension at the inner diameter side of the post 4e, it is advantageous in view of securing the strength and durability of the cage 4.

Furthermore, as shown in FIG. 13, the amount of movement of the torque transmitting ball 3 in the pocket will become the maximum in the circumferential direction in the vicinity of the phase angle λ65°, and the contacting point at this position comes to the outer diameter side beyond the pitch circle PCD. The circumferential dimension of the pocket 4c at the outer diameter side area beyond the pitch circle PCD is increased with the construction shown in FIG. 10 and is not changed with the construction shown in FIG. 11. Therefore, no interference with the pocket surfaces in line with the circumferential movement of the torque transmitting ball 3 occurs.

The constant velocity joint according to the embodiment described above can be widely utilized as a power transmission element in automobile, industrial machines, etc., and especially, the same is preferable as a joint for a power transmission mechanism of automobile, for example, for connection of a drive shaft and a propeller shaft thereof.

Figure 12:
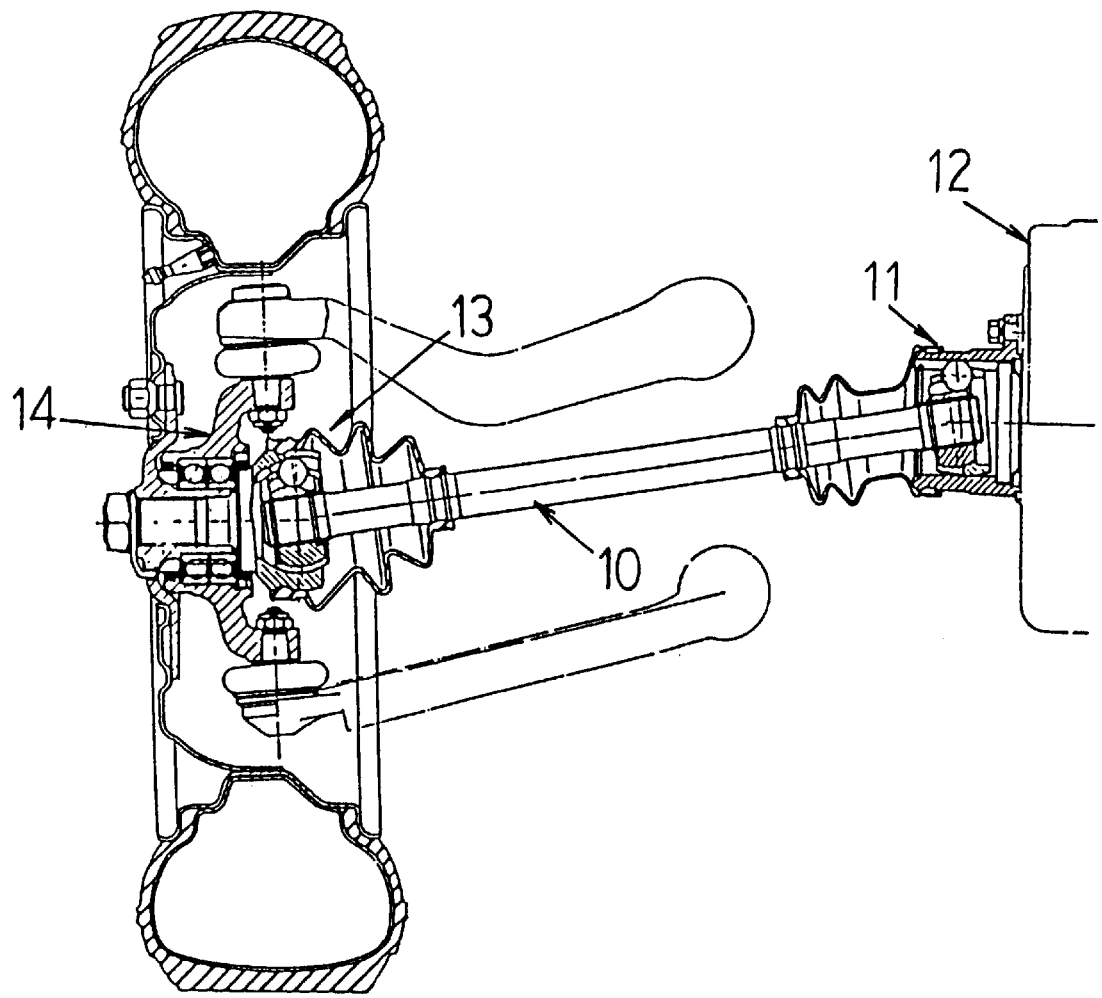
FIG. 12 is a view showing one example (drive shaft) of a power transmission mechanism of automobile.

For connection of a drive shaft or a propeller shaft of automobile, usually both a fixed type constant velocity joint and a plunging type constant velocity joint are used as a pair. For example, in a power transmission mechanism for transmitting power of an engine to wheels it is necessary to deal with both the angular and axial displacements due to relatively positional changes between the engine and wheels, as shown in FIG. 12, so that one end of a drive shaft 10 intervened between the engine side and the wheel side is connected to a differential gear 12 via a plunging type constant velocity joint 11 and the other end thereof is connected to a wheel 14 via a fixed type constant velocity joint 13. When the constant velocity joint according to the abovementioned embodiment is used as the plunging type constant velocity joint for connecting this drive shaft, it is possible to attempt to make the size of the joint smaller while securing the strength, load capacity and durability equivalent to or exceeding those of the comparative article (a constant velocity joint having six balls). Therefore, it is remarkably advantageous in view of decreasing the vehicle weight and accordingly decreasing the fuel consumption.

As already described above, according to the invention, it is possible to secure the strength, load capacity, durability and operating angle equivalent to or exceeding those of the comparative article (a constant velocity joint having six balls) while making further compact the size in a plunging type constant velocity joint.

TABLE 1

| r1 | 2.8 | 2.9 | 3.0 | 3.1 | 3.2 | 3.3 | 3.4 | 3.5 | 3.6 |
|---|---|---|---|---|---|---|---|---|---|
| Durability | ○ | ○ | ○ | ○ | ○ | ○ | ○ | ○ | ○ |
| Strength of outer joint member | X | Δ | Δ | ○ | ○ | ○ | ○ | ○ | ○ |
| Strength of inner joint member | X | Δ | Δ | ○ | ○ | ○ | ○ | ○ | ○ |
| Strength of cage | X | Δ | Δ | ○ | ○ | ○ | ○ | ○ | ○ |

○: good  Δ: rather good  X: bad

TABLE 2

| r1 ($=PCD_{BALL}/D_{BALL}$) | | r2 ($=D_{OUTER}/PCD_{SERR}$) | |
|---|---|---|---|
| Embodiment article (Eight balls) | Comparative article (six balls) | Embodiment article (Eight balls) | Comparative article (six balls) |
| $2.9 \leq r1 \leq 4.5$ | $2.8 \leq r1 \leq 3.2$ | $2.5 \leq r2 \leq 3.5$ | $3.1 \leq r2$ |

What is claimed is:

1. A plunging type constant velocity joint comprising:
   an outer joint member having a plurality of straight guide grooves formed on an inner cylindrical surface thereof and extending in an axial direction of the outer joint member;
   an inner joint member having a plurality of straight guide grooves formed on an outer spherical surface thereof and extending in an axial direction of the inner joint member;
   a plurality of ball tracks defined between the guide grooves of the outer joint member and the guide grooves of the inner joint member;
   a plurality of torque transmitting balls each disposed in each of the ball tracks; and
   a cage having pockets for retaining the torque transmitting balls, an outer spherical surface brought into contact with inner cylindrical surface of the outer joint member to be guided thereby, and an inner spherical surface brought into contact with the outer spherical surface of the inner joint member to be guided thereby, wherein the spherical center of the outer spherical surface of the cage and the spherical center of the inner spherical surface of the cage are respectively offset to the opposite side in an axial direction of the cage with respect to centers of the pockets,
   wherein the number of the ball tracks and that of the torque transmitting balls are respectively eight.

2. A plunging type constant velocity joint as set forth in claim 1, wherein the ratio r1 ($=PCD_{BALL}/D_{BALL}$) of the pitch circuit diameter ($PCD_{BALL}$) to the diameter ($D_{BALL}$) of the torque transmitting balls is in the range of $2.9 \leq r1 \leq 4.5$.

3. A plunging type constant velocity joint as set forth in claim 1, wherein the ratio r1 ($=PCD_{BALL}/D_{BALL}$) of the pitch circuit diameter ($PCD_{BALL}$) to the diameter ($D_{BALL}$) of the torque transmitting balls is in the range of $2.9 \leq r1 \leq 4.5$, and the ratio r2 ($=D_{OUTER}/PCD_{SERR}$) of the outer diameter ($D_{OUTER}$) of the outer joint member to the pitch circle diameter ($PCD_{SERR}$) of serrations formed on an inner surface of the inner joint member for connection to a shaft is in the range of $2.5 \leq r2 \leq 3.5$.

4. A plunging type constant velocity joint as set forth in claim 1, 2 or 3, wherein the spherical center of the outer spherical surface and the spherical center of the inner spherical surface of the cage are respectively equidistantly (distance f) offset opposite to each other in the axial direction with respect to the pocket centers, and the ratio r3 ($=f/PCD_{BALL}$) of the offset amount (f) to the pitch circle diameter ($PCD_{BALL}$) of the torque transmitting balls is in the range of $0.05 \leq r3 \leq 0.15$.

5. A plunging type constant velocity joint as set forth in claim 4, wherein each of the pockets of the cage has a pair of pocket surfaces opposed to each other in the axial direction and has a projection projecting from the outer spherical surface of the cage in the vicinity of the pocket surface positioned at the small-diametered side of the cage of the pair of pocket surfaces.

6. A plunging type constant velocity joint as set forth in claim 4, wherein each of the pockets of said cage has a pair of pocket surfaces opposed to each other in the circumferential direction, the pair of pocket surfaces being tapered surfaces shaped so as to spread toward the outer diameter direction.

7. A plunging type constant velocity joint as set forth in claim 2 or 3, wherein each of the pockets of the cage has a pair of pocket surfaces opposed to each other in the axial direction and has a projection projecting from the outer spherical surface of the cage in the vicinity of the pocket surface positioned at the small-diametered side of the cage of the pair of pocket surfaces.

8. A plunging type constant velocity joint as set forth in claim 2 or 3, wherein each of the pockets of the cage has a pair of pocket surfaces opposed to each other in the circumferential direction, the pair of pocket surfaces being tapered surfaces shaped so as to spread toward the outer diameter direction.

9. A plunging type constant velocity joint as set forth in claim 1, which is used for a power transmission mechanism of an automobile.

* * * * *